United States Patent
Meng

(10) Patent No.: US 9,835,519 B2
(45) Date of Patent: Dec. 5, 2017

(54) HANDHELD APPARATUS FOR MEASURING LENS SURFACE POWER

(71) Applicant: TOPLENS HANGZHOU INC., Hangzhou, Zhejiang (CN)

(72) Inventor: Hongxiang Meng, Zhejiang (CN)

(73) Assignee: TOPLENS HANGZHOU INC., Hangzhou (CN)

( * ) Notice: Subject to any disclaimer, the term of this patent is extended or adjusted under 35 U.S.C. 154(b) by 203 days.

(21) Appl. No.: 14/813,155

(22) Filed: Jul. 30, 2015

(65) Prior Publication Data

US 2015/0330865 A1    Nov. 19, 2015

Related U.S. Application Data

(63) Continuation-in-part of application No. PCT/CN2013/087640, filed on Nov. 21, 2013.

(30) Foreign Application Priority Data

Oct. 11, 2013 (CN) .......................... 2013 1 0471241

(51) Int. Cl.
*G01M 11/02* (2006.01)
*G02C 13/00* (2006.01)

(52) U.S. Cl.
CPC .... *G01M 11/0214* (2013.01); *G01M 11/0228* (2013.01); *G02C 13/003* (2013.01)

(58) Field of Classification Search
None
See application file for complete search history.

(56) References Cited

U.S. PATENT DOCUMENTS

| | | | | |
|---|---|---|---|---|
| 2,723,594 A * | 11/1955 | Lueck | ................ | G01M 11/0228 356/125 |
| 3,664,745 A * | 5/1972 | Smith | .................... | G01B 11/06 356/492 |
| 3,810,698 A * | 5/1974 | Alaska | ................... | G01N 21/21 356/124 |
| 4,007,990 A * | 2/1977 | McDevitt, Jr. | ..... | G01M 11/0235 351/211 |
| 4,257,673 A * | 3/1981 | Matthijsse | ........... | G02B 6/2848 359/569 |
| 4,275,964 A * | 6/1981 | Vassiliadis | ......... | G01M 11/0235 356/125 |
| 4,341,471 A * | 7/1982 | Hogg | ................. | G01N 15/1436 250/574 |

(Continued)

OTHER PUBLICATIONS

International Search Report of PCT Patent Application No. PCT/CN2013/087640 dated Jul. 23, 2014.

(Continued)

*Primary Examiner* — Shawn Decenzo
*Assistant Examiner* — Jarreas C Underwood

(57) ABSTRACT

This invention discloses a handheld apparatus for measuring surface power or radius of prescription ophthalmic spectacle lenses, optical lenses or molds blocked with or without chuck during Rx production, and after comparing measurement results with designed data, providing correction data to the processing machines via wireless connection for correction processing if needed. The handheld apparatus integrates an optical measurement head into a monolithic optical system.

12 Claims, 3 Drawing Sheets

(56) References Cited

U.S. PATENT DOCUMENTS

| | | | | |
|---|---|---|---|---|
| 4,410,267 | A * | 10/1983 | Shindow | G01M 11/0235 356/124 |
| 4,601,575 | A * | 7/1986 | Tamaki | G01M 11/0235 356/124 |
| 4,701,005 | A * | 10/1987 | Noguchi | G02B 5/32 359/17 |
| 5,469,261 | A * | 11/1995 | Hellmuth | G01M 11/0228 356/497 |
| 5,587,815 | A * | 12/1996 | Sato | G02B 5/1876 359/11 |
| 6,033,074 | A * | 3/2000 | Miyake | A61B 3/028 351/212 |
| 6,278,548 | B1 * | 8/2001 | Shimano | B82Y 10/00 359/565 |
| 6,493,143 | B2 * | 12/2002 | Kato | G02B 5/1866 359/354 |
| 6,511,420 | B1 * | 1/2003 | Farrell | A61B 3/145 351/205 |
| 6,761,454 | B2 * | 7/2004 | Lai | A61B 3/103 351/216 |
| 7,158,222 | B2 * | 1/2007 | Taguchi | G02C 7/02 351/159.39 |
| 7,319,559 | B2 * | 1/2008 | Nakama | G02B 5/1823 359/569 |
| 7,490,940 | B2 * | 2/2009 | Lai | A61B 3/1015 351/205 |
| 7,572,015 | B2 * | 8/2009 | Kobayashi | G02B 27/48 348/195 |
| 7,646,475 | B2 * | 1/2010 | Divo | G01M 11/0235 356/124 |
| 7,659,971 | B2 * | 2/2010 | Warden | A61B 3/1015 356/124 |
| 7,876,428 | B2 * | 1/2011 | Divo | G01M 11/0214 356/124 |
| 8,358,456 | B2 * | 1/2013 | Urakawa | H04N 9/3129 359/202.1 |
| 8,509,880 | B1 * | 8/2013 | Zuluaga | A61B 1/00 600/472 |
| 8,599,484 | B2 * | 12/2013 | Miyasaka | G02B 5/1861 356/603 |
| 9,052,512 | B2 * | 6/2015 | Miyasaka | G02B 27/4266 |
| 2003/0113065 | A1 * | 6/2003 | Ohmura | G02B 6/02138 385/37 |
| 2006/0092503 | A1 * | 5/2006 | Saunders | G02B 21/0008 359/368 |

OTHER PUBLICATIONS

Chen Liu, Lensometer, J. Applied Optics, Jan. 31, 2004, pp. 55-57, vol. 25(1).

* cited by examiner

FIG.1a
FIG.1b
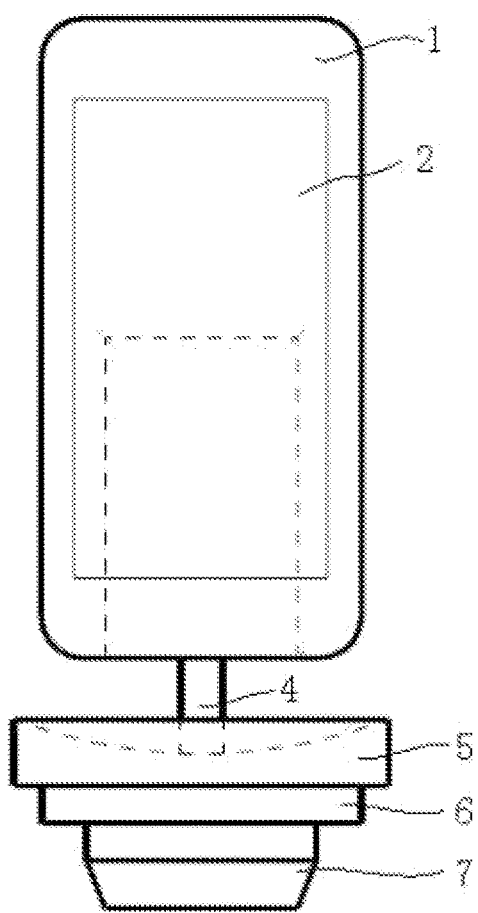
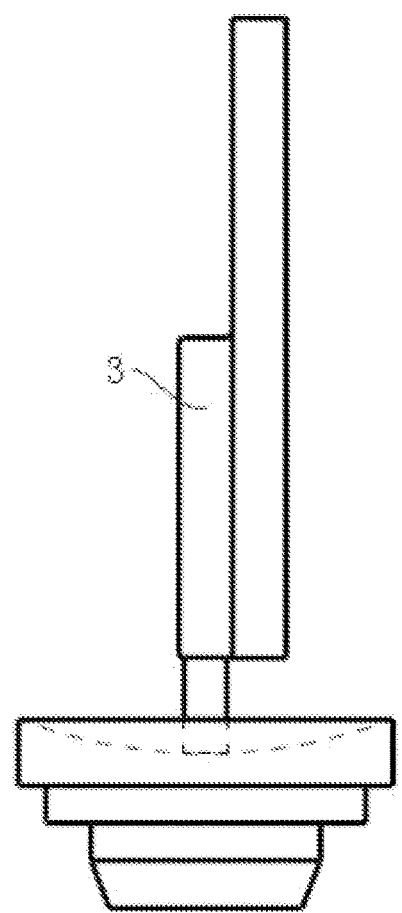

HANDHELD APPARATUS FOR MEASURING LENS SURFACE POWER

CROSS REFERENCE TO RELATED APPLICATIONS

The present application is a Continuation-in-part Application of PCT application No. PCT/CN2013/087640 filed on Nov. 21, 2013, which claims the benefit of Chinese Patent Application No. 201310471241.X filed on Oct. 11, 2013. All the above are hereby incorporated by reference.

FIELD OF THE INVENTION

The present invention includes an apparatus based monolithic optical system, including imaging sensor that measures surface power, cylinder, axis and other optical characteristics of the polished surface of prescription ophthalmic spectacle lenses or molds with or without chuck during Rx production.

BACKGROUND OF THE INVENTION

During the prior arts ophthalmic spectacle lens Rx production, the lens production and measurement are irrelevant and cannot form a closed loop; the semi-finished lens should be first blocked with chuck, which will then be clamped on the generation machine for surface generating and grinding, and later moved to the polishing machine for surface polishing. After polishing, the polished lens will be engraved on the surface. Then the engraved lens should be de-blocked from the chuck, and its optical power and other optical characteristics will be measured on measuring machines, such as conventional Foci meter. If the power measured is out of tolerance, this lens should be rejected and discarded because it is impossible to reprocess the lens. Any lens that has been de-blocked from the chuck cannot be kept at the same position as before. Even a very tiny difference will cause the surface deform and make reprocess to fail. As a result, the rejected and discarded lens may lead to too much waste during Rx production and a large time delay for quality control.

A number of prior arts measuring apparatus exist that measures the power, cylinder, axis and other characteristics of ophthalmic lenses by transmission light and those lenses have to be removed from the blockers. Because of the transmission light structure, commercial instruments available for performing this job can only measure the lens transmission power and some characteristics, but not the surface power and other characteristics of surface. However, during the Rx production processing, it is more important to guarantee the surface power than other characteristics to be the same as the designed data. With compared results, the surface optical measurement apparatus will be better than lens meter. It is directly measuring the surface processed and getting direct results of the surface.

The prior arts measuring apparatus cannot calculate the power, cylinder, axis and other characteristics for ophthalmic lens or mold surface by reflect light or send feedback of correction data obtained from results comparison to the machines for correction processing. Commercial instruments available for performing this job such as Belgium Automatic and Robotics' Focovision SR2 and Dual Lens Mapper can only provide the result of surface power, cylinder, axis and other characteristic and display the optical difference between measuring results and design data. Checking lens power with chuck is even impossible for Focovision SR2. For de-blocked lenses, although whether the processing surface is qualified can be decided from the results, how to correct the fault surface cannot be provided to the machines.

The prior arts measuring apparatus has the disadvantage and drawback of bulkiness and immovability while measuring the power, cylinder, axis and other optical characteristics for ophthalmic lens or mold surface by reflect light. Commercial instruments available for performing this job such as Automatic and Robotics' Focovision SR2 and Dual Lens Mapper normally consists of separated optical components and industrial computer in the measuring system. The measuring system is normally a desktop device which consists of optical illumination source, optical path system, lens holder and detecting component, with all components not bonded with each other, so the measuring system is bulky and immovable for stable running. Industrial computer is used for data acquisition, analysis and display.

The prior arts measuring apparatus measuring the optical power, cylinder, axis and other optical characteristics for ophthalmic lens or mold surface can calculate the feedback correction data after comparing with designed data as a three coordinate machine which includes a measurement pin, encodes, at least three axis slideway, motors, and a movement control system. The optical power, cylinder, axis and other optical characteristics are calculated from the surface coordinate. However this measuring method is very time consuming and measuring one lens may take about 10 minutes. And also another disadvantage is that this apparatus is very huge and immovable.

SUMMARY OF THE INVENTION

The present invention seeks to provide an apparatus to evaluate surface of ophthalmic lenses or molds blocked on the chuck during Rx production.

The present invention also seeks to provide an apparatus for in-situ quality control of ophthalmic lens production, which overcomes the disadvantage and drawbacks of existing production method that does not have in-situ quality control and cannot do correction if lens surface power is out of tolerance.

The present invention also seeks to provide an improved lens surface measurement apparatus, which overcomes the disadvantage and drawbacks of existing measurement instruments that are not handheld and cannot be used anytime or anywhere.

A handheld measurement apparatus based on the present invention comprises a main control body and a monolithic optical measurement head which is integrated into the main control body. The main control body comprises at least a microprocessor data processing board such as DSP, smart phone, and a display screen. The monolithic optical measurement head comprises at least a light source, a ring-shaped aperture, an image sensor. During measurement, the surface of the ophthalmic lens or mold blocked with or without chuck is placed against the lens support. The light source projects a light beam onto the surface to be measured. The reflected light beam goes through the ring-shaped aperture and forms an image on the image sensor, wherein the formed image is subject to the surface power of the surface to be measured. The microprocessor processes the image data and displays the calculated surface power on the display screen.

In a preferred embodiment of the present invention, the main control body is a present smart mobile phone, which includes a microprocessor, a display screen, an LED light, and a CMOS chip. The LED light is utilized as the light source and the CMOS chip is utilized as the image sensor.

In another preferred embodiment of the present invention, the optical measurement head comprises a compact monolithic optical system in which all optical components are connected to each other by optical contact bonding or glue cement, and image sensor can be bonded to monolithic optical measurement head as complete monolithic measurement head system, or mounted separately. The alignment of the optical components is done during the bonding process and no further alignment is necessary during assembling or operation, which reduces the complexity and improves the stability and reliability of the apparatus. Thanks to complete monolithic optical system, the volume of the optical measurement head can be minimized so that the apparatus is easy to handle with one hand.

In another preferred embodiment of the present invention, the main control body includes barcode or QR code reader via camera and a wireless communication module through which the designed surface shape can be achieved from the Rx server. The microprocessor of the main control body calculates the theoretical surface power according to the designed surface shape and determines if the measured ophthalmic lens or mold is ok or not.

BRIEF DESCRIPTION OF THE FIGURES

The present invention will be understood and appreciated more from the following detailed description, along with the supplemental drawings in which:

FIG. 1a and FIG. 1b illustrate an external view of a handheld apparatus according to the preferred embodiment of the present invention;

DETAILED DESCRIPTION OF PREFERRED EMBODIMENTS

Figure 2:
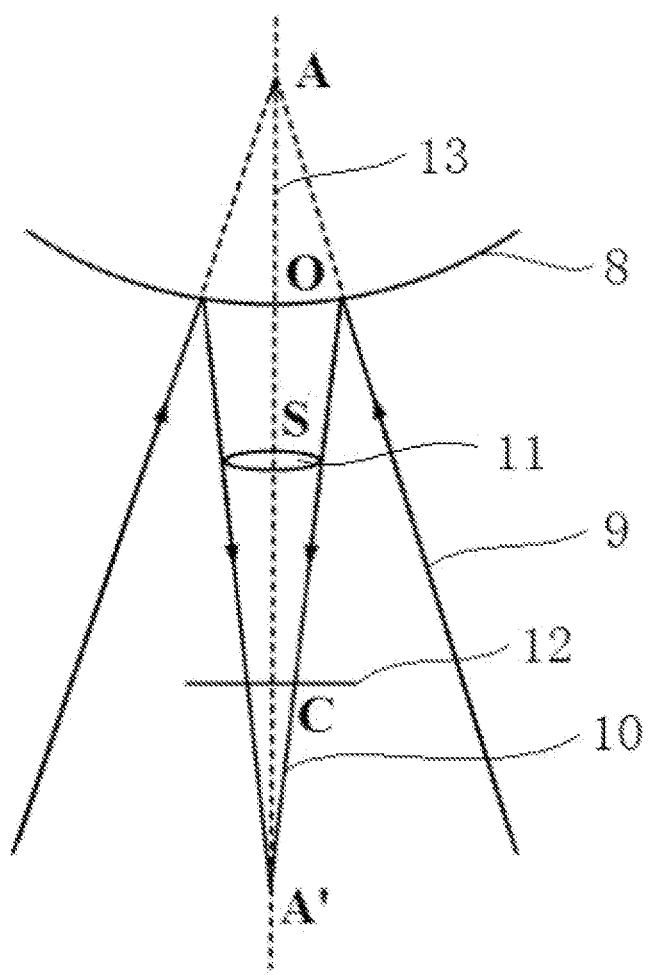
FIG. 2 shows the principle of the surface power measurement apparatus.

FIG. 1a and FIG. 1b show a handheld measurement apparatus according to one embodiment of the present invention, and is respectively a front view and a left-side view of the measurement apparatus in working status. As shown in FIG. 1a and FIG. 1b, the handheld measurement apparatus includes a data processing unit (here we call it a smartphone) such as smart mobile phone 1 as the main control body and an optical measurement head 3 which is fixed on the back side of the smart mobile phone 1. During Rx production, an ophthalmic lens blank or mold 5 is blocked on a chuck 7 via alloy or wax 6. The surface generating machine and polishing machine clamp the chuck 7 on their work piece spindle and process the top surface of the lens blank or mold 5. After polishing, the lens or mold 5 blocked on the chuck 7 is placed against the lens support 4 of the measurement head 3 and the local optical surface power, e.g., spherical power, cylinder power and cylinder axis, of the small surface area where the lens or mold 5 contacts the lens support 4 can be measured and displayed on the display screen 2 of the smart mobile phone 1. The small surface area to be measured can be the center of a single vision lens or mold or the far-view and near-view reference points of a progressive lens or mold or any other point on the surface.

FIG. 2 shows the optical principle of the surface power measurement apparatus. As shown in FIG. 2, an incident light beam 9 converges at a point A on the optical axis 13. The surface to be measured is placed against a fixed lens support which intersects with the optical axis 13 at a point O. A ring-shaped aperture 11 with a fixed radius r and an image sensor 12 are fixed on the same side as the incident beam 9 and intersect with the optical axis 13 at points S and C. The incident beam 9 reaches the surface and is reflected. The reflected light beam 10 goes through the ring-shaped aperture 11 and forms an image on the image sensor 12.

First assume that the surface 8 is a spherical surface with a radius of curvature R, then the reflected light beam 10 will also converge at a point A' on the optical axis 13, and the image formed on the sensor 12 will be a round ring with a radius c. In this illustrated optical system, an object at point A forms an image at point A' by the reflective surface 8. According to FIG. 2, the object distance l and image distance l' can be described by the following equations:

$$l = \overline{OA} \quad (1)$$

$$l' = -(\overline{OS} + \overline{SC} + \overline{CA'}) \quad (2)$$

where $\overline{OA}$, $\overline{OS}$ and $\overline{SC}$ are already known.

According to homothetic triangle theory, there is:

$$\frac{\overline{CA'}}{\overline{SC}} = \frac{c}{r-c} \quad (3)$$

Thus equation (2) can be rewritten as:

$$l' = -\left(\overline{OS} + \overline{SC} + \frac{c}{r-c}\overline{SC}\right) = -\left(\overline{OS} + \frac{r}{r-c}\overline{SC}\right) \quad (4)$$

According to the imaging formula of a reflective sphere, there is:

$$\frac{1}{l} + \frac{1}{l'} = \frac{2}{R} \quad (5)$$

Hence, the radius of curvature R of surface 8 is:

$$R = \frac{2}{\frac{1}{l} + \frac{1}{l'}} = \frac{2}{\frac{1}{\overline{AO}} - \frac{1}{\overline{OS} + \frac{r}{r-c}\overline{SC}}} \quad (6)$$

The spherical power S of surface 8 can thus be calculated by:

$$S = \frac{n-1}{R} \times 1000 = 500(n-1)\left(\frac{1}{\overline{AO}} - \frac{1}{\overline{OS} + \frac{r}{r-c}\overline{SC}}\right) \quad (7)$$

where n is the refractive index of the lens or mold 5.

When the surface 8 is a cylinder surface with two radii of curvature $R_1$ and $R_2$ on its two orthogonal principal meridians, the image formed on the sensor 12 will be an elliptic ring with a major radius $c_1$ and a minor radius $c_2$. The two spherical power $S_1$ and $S_2$ on the two orthogonal principal meridians of the cylinder surface can be calculated by:

$$S_1 = \frac{n-1}{R_1} \times 1000 = 500(n-1)\left(\frac{1}{\overline{AO}} - \frac{1}{\overline{OS} + \frac{r}{r-c_1}\overline{SC}}\right) \quad (8a)$$

$$S_2 = \frac{n-1}{R_2} \times 1000 = 500(n-1)\left(\frac{1}{\overline{AO}} - \frac{1}{\overline{OS} + \frac{r}{r-c_2}\overline{SC}}\right) \quad (8b)$$

The cylinder power C can be calculated by:

$$C = |S_1 - S_2| \quad (9)$$

And the cylinder axis is the orientation of the major axis of the elliptic ring image on the sensor 12.

Figure 3:
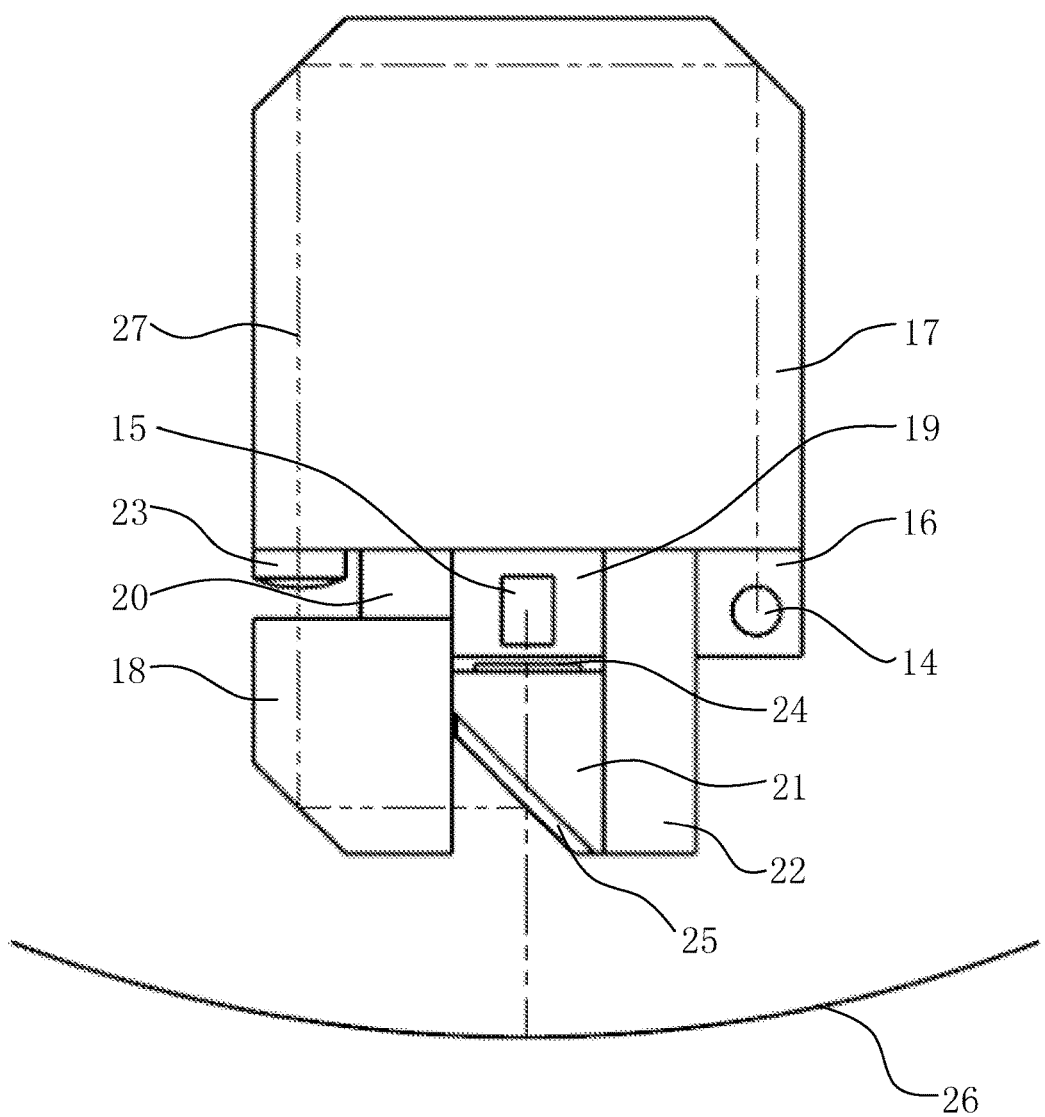
FIG. 3 illustrates a monolithic optical system according to a preferred embodiment of the present invention.

FIG. 3 illustrates a monolithic optical system according to the preferred embodiment of the present invention with the aid of which the above-described principle can be carried out. The smart mobile phone includes an LED flash light 14 and a CMOS image sensor 15. The monolithic optical system comprises optical components including reflective prisms 16, 17, 18 and 19, support prisms 20, 21 and 22, a converging lens 23, a ring-shaped aperture 24, and a beam splitter 25 and CMOS image sensor 15. All the optical components and CMOS image sensor are fixed with each other by optical contact bonding or glue cement.

During measurement, the LED flash light 14 or additional separated LED works as the light source of the optical measurement head. The light beam emitted from the LED flash light 14 is redirected by the reflective prisms 16, 17 and 18, and goes along the optical axis 27 inside the monolithic optical system. A converging lens 23 converts the light beam from the light source into the desired beam which is reflected by a beam splitter 25 and is projected onto surface 26 of the lens or mold to be measured. The light beam reflected from surface 26 goes through the beam splitter 25, a ring-shaped aperture 24, and is then reflected by a reflective prism 19 to be projected onto the CMOS sensor 15 to form an image. The image is analyzed by the smart mobile phone and the surface power of the local surface where the lens support contacts is calculated and displayed on the display screen of the smart mobile phone.

In one embodiment of the present invention, the lens support includes a polished ruby, stainless steel or sapphire ring to contact the lens surface in order not to damage the surface to be measured.

In a further preferred embodiment of the present invention, the smart mobile phone includes a wireless communication module, e.g., GSM, GPRS, 3G, LTE, Bluetooth or WiFi or WLAN. When measuring a lens or mold, the smart mobile phone communicates with the Rx server via the wireless communication module and gets the designed surface data. The smart mobile phone calculates the theoretical local surface power and compares it with the measured result and tells if the lens or mold is ok or not.

What is claimed is:

1. A handheld apparatus for measuring lens surface power including spherical power, cylindrical power and cylinder axis of an ophthalmic lens or a mold blocked with or without a chuck during Rx production, the apparatus comprising:
   an optical measurement head, wherein the optical measurement head comprises optical components including at least one or more first reflective prisms, a second reflective prism, a converging lens, a ring-shaped aperture, a beam splitter and an image sensor, wherein the one or more first reflective prisms are configured to redirect a light beam, incident on the one or more first reflective prisms, to the converging lens thereby obtaining a converged light beam, wherein the beam splitter is configured to reflect the converged light beam and project the converged light beam reflected on a surface of the lens or mold, and wherein the beam splitter is further configured to project a light beam reflected from the lens surface or the mold on the ring shaped aperture, and wherein the second reflective prism is configured to reflect the light beam reflected from the lens surface or the mold and project the reflected light beam from the lens surface or the mold on the image sensor in order to form an image; and
   a main control body, wherein the main control body comprises a data processing and control unit and a display screen, wherein the data processing and control unit is configured to perform analysis of the image in order to calculate surface power, and wherein the display screen is configured to display results of the analysis performed by the data processing and control unit.

2. The handheld apparatus of claim 1, wherein the optical measurement head is a monolithic optical system, and wherein the optical components are connected to each other by an optical contact bonding or a glue cement.

3. The handheld apparatus of claim 1, wherein the ophthalmic lens or the mold blocked on the chuck is placed against a lens support of the optical measurement head.

4. The handheld apparatus of claim 3, wherein the lens support comprises a ruby or stainless steel or sapphire ring in order to contact the lens surface.

5. The handheld apparatus of claim 1, wherein the main control body further comprises a wireless communication module configured for receiving and sending lens parameters and results between a Rx server and the handheld apparatus.

6. The handheld apparatus of claim 5, wherein the wireless communication module uses a communication protocols chosen from one of the following GSM, GPRS, 3G, LTE, Bluetooth, WiFi, WLAN.

7. The handheld apparatus of claim 1, wherein the main control body is smart mobile phone, and wherein the light beam incident on the one or more first reflective prisms is a LED light of the smart mobile phone.

8. The handheld apparatus of claim 1, wherein the light beam incident on the one or more first reflective prisms is provided by a light source comprised in the optical measurement head.

9. The handheld apparatus of claim 1, wherein the spherical surface power (S) of the lens or mold is calculated by a mathematical equation, $$S = \frac{(n-1)}{R} \times 1000 \text{ where}$$

$n$ = a refrative index of the lens or mold, $R$ = radius of curvature of surface.

$S = (n-1)/R \times 1000$ where n = a refrative index of the lens or mold,

R = radius of curvature of surface.

10. The handheld apparatus of claim 9, wherein the radius (R) is calculated by a mathematical equation, $$R = \frac{2}{\frac{1}{l} + \frac{1}{l'}} \text{ where}$$

-continued $l$ = object distance $l'$ = image distance.

$R=2/1/l+1/l'$ where l=object distance
l'=image distance.

11. The handheld apparatus of claim 10, wherein the object distance (l) is distance from converging point on the optical axis of an incident light beam to the intersecting point of the optical axis on the lens surface.

12. The handheld apparatus of claim 10, wherein the image distance (l') is additive inverse of sum of distance of the intersecting point of the optical axis of the lens surface to the intersecting point of the optical axis on the ring aperture, distance of the intersecting point of the optical axis on the ring aperture to the intersecting point of the optical axis on the image sensor and the distance of the intersecting point of the optical axis on the image sensor to converging point on the optical axis of the reflected light beam.

* * * * *